United States Patent
Sakou

(10) Patent No.: US 7,644,143 B2
(45) Date of Patent: Jan. 5, 2010

(54) DATA PROCESSING DEVICE, REGISTRATION METHOD, AND PROGRAM

(75) Inventor: Ritsuto Sakou, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 11/379,567

(22) Filed: Apr. 20, 2006

(65) Prior Publication Data

US 2006/0242260 A1  Oct. 26, 2006

(30) Foreign Application Priority Data

Apr. 25, 2005  (JP)  ............................. 2005-126371

(51) Int. Cl.
G06F 15/177 (2006.01)
(52) U.S. Cl. .................................... 709/221
(58) Field of Classification Search .................. 709/221
See application file for complete search history.

(56) References Cited

U.S. PATENT DOCUMENTS

| | | | |
|---|---|---|---|
| 7,007,080 B2* | 2/2006 | Wilson | 709/221 |
| 7,299,304 B2* | 11/2007 | Saint-Hilaire et al. | 710/11 |
| 2003/0101294 A1 | 5/2003 | Saint-Hilaire | |
| 2003/0126241 A1* | 7/2003 | Nagura et al. | 709/221 |
| 2003/0177236 A1* | 9/2003 | Goto et al. | 709/225 |
| 2003/0236779 A1* | 12/2003 | Choi et al. | 707/3 |
| 2004/0085900 A1* | 5/2004 | Nishio | 370/230 |
| 2004/0264439 A1* | 12/2004 | Doherty et al. | 370/352 |
| 2005/0076141 A1* | 4/2005 | Williams et al. | 709/245 |
| 2005/0086379 A1* | 4/2005 | Asami | 709/245 |
| 2005/0188063 A1* | 8/2005 | Finley et al. | 709/221 |
| 2006/0135205 A1* | 6/2006 | Metke et al. | 455/557 |
| 2006/0184661 A1* | 8/2006 | Weisman et al. | 709/224 |
| 2006/0184693 A1* | 8/2006 | Rao et al. | 709/245 |
| 2006/0282514 A1* | 12/2006 | Saint-Hilaire et al. | 709/218 |
| 2008/0070573 A1* | 3/2008 | Dutta et al. | 455/435.1 |

FOREIGN PATENT DOCUMENTS

| | | |
|---|---|---|
| JP | 11-296467 A | 10/1999 |
| JP | 2000-244533 A | 9/2000 |
| JP | 2004-048462 A | 2/2004 |

OTHER PUBLICATIONS

Stapp et al; "Interaction between DHCP and DNS", DHC Working Group; Mar. 10, 2000.*
S. Thomson et al.; "RFC 2136—Dynamic Updates in the Domain Name System (DNS Update)"; Apr. 1997.*
Stapp et al., "Interaction between DHCP and DNS", DHC Working Group, Internet Draft, Mar. 10, 2000.*

* cited by examiner

Primary Examiner—J Bret Dennison
(74) Attorney, Agent, or Firm—Canon U.S.A. Inc., I.P. Division

(57) ABSTRACT

A data processing device according to the present invention can request a first server to transmit identification information for identifying the data processing device and an address of the data processing device to a second server. Moreover, the data processing device can also transmit the identification information for identifying the data processing device and the address of the data processing device to the second server without the intermediation of the first server.

13 Claims, 11 Drawing Sheets

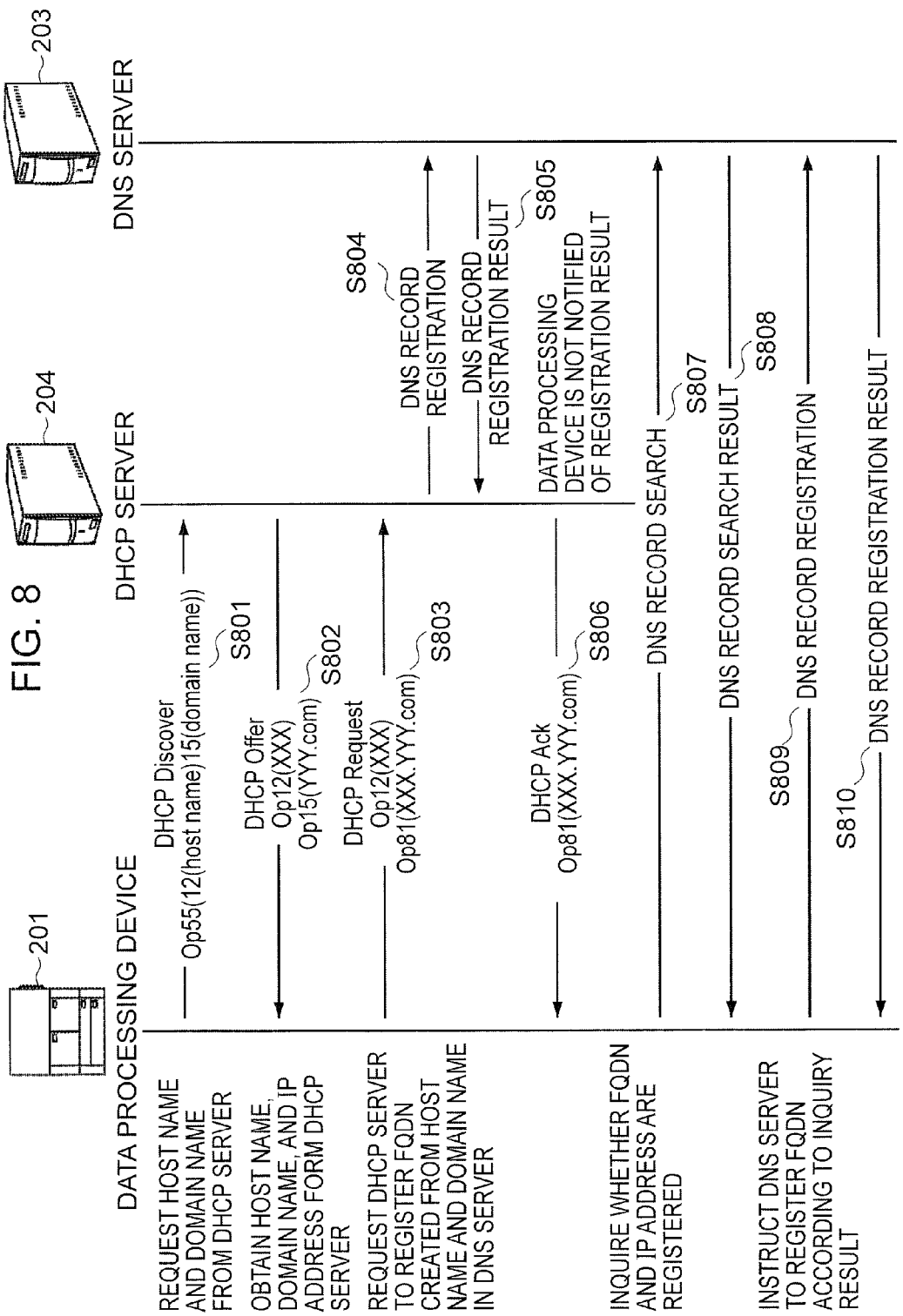

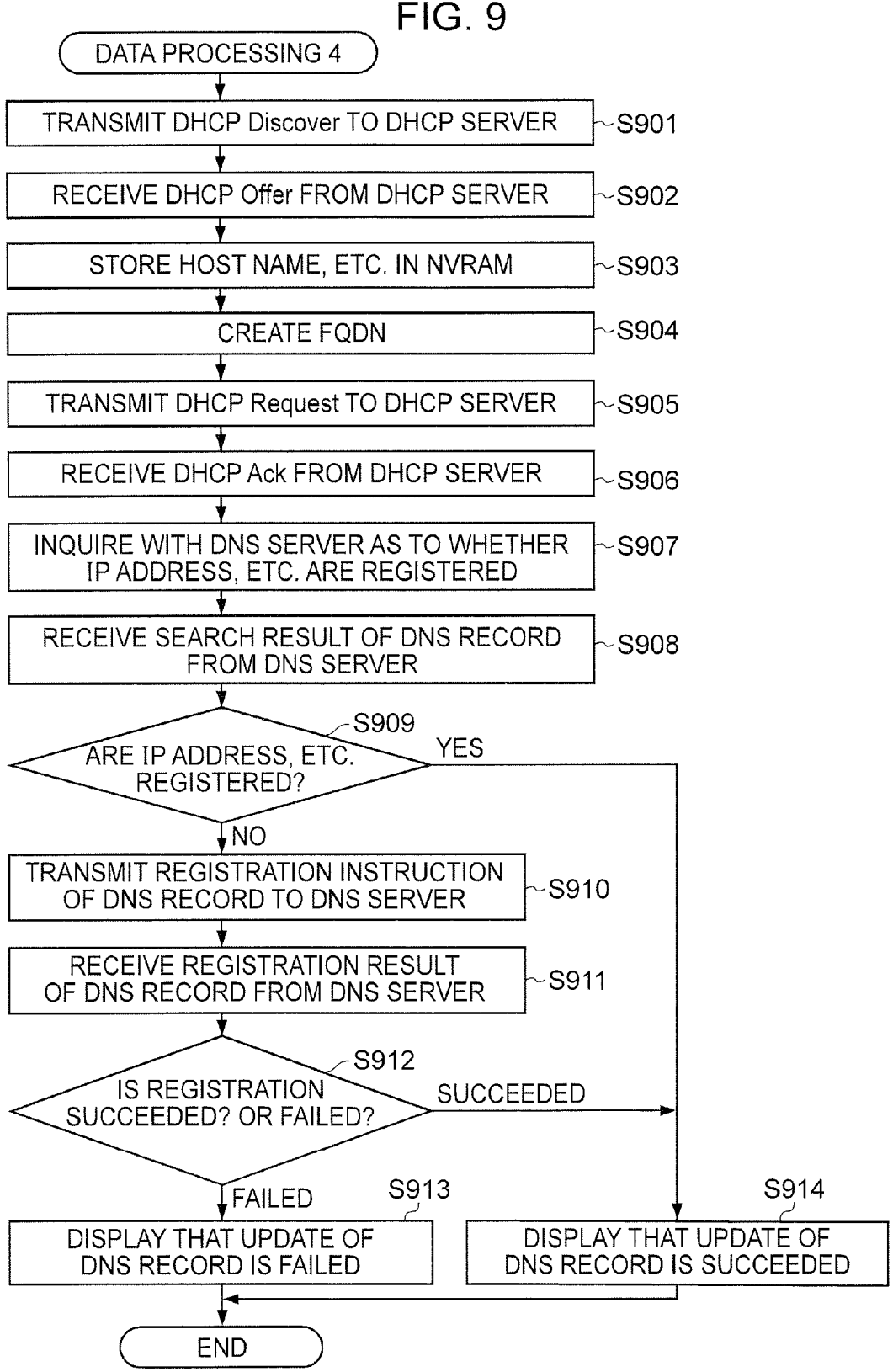

FIG. 10

| | 1015 | 1016 | 1017 | 1018 | 1019 |
|---|---|---|---|---|---|
| 1011 — REGISTRATION RESULT INDICATED BY DHCP Ack | SUCCESS | FAILURE | FAILURE | NO SPECIFICATION OF OPTION 81 | NO SPECIFICATION OF OPTION 81 |
| 1012 — WHETHER DATA PROCESSING DEVICE INSTRUCTS DNS REGISTRATION BY ITSELF OR NOT | DNS REGISTRATION IS NOT INSTRUCTED | DNS REGISTRATION IS INSTRUCTED | DNS REGISTRATION IS INSTRUCTED | INSTRUCTION OF DNS REGISTRATION DEPENDS ON INQUIRY RESULT | INSTRUCTION OF DNS REGISTRATION DEPENDS ON INQUIRY RESULT |
| 1013 — REGISTRATION RESULT CHECKED BY DATA PROCESSING DEVICE ITSELF | — | SUCCESS | FAILURE | SUCCESS | FAILURE |
| 1014 — CONTENT DISPLAYED ON OPERATION PANEL | UPDATE OF DNS RECORD IS SUCCEEDED | UPDATE OF DNS RECORD IS SUCCEEDED | UPDATE OF DNS RECORD IS FAILED | UPDATE OF DNS RECORD IS SUCCEEDED | UPDATE OF DNS RECORD IS FAILED |

FIG. 11

| | 1020 | 1021 | 1022 | 1023 | 1024 | 1025 |
|---|---|---|---|---|---|---|
| 1011 REGISTRATION RESULT INDICATED BY DHCP Ack | SUCCESS | SUCCESS | FAILURE | FAILURE | NO SPECIFICATION OF OPTION 81 | NO SPECIFICATION OF OPTION 81 |
| 1012 WHETHER DATA PROCESSING DEVICE INSTRUCTS DNS REGISTRATION BY ITSELF OR NOT | DNS REGISTRATION IS INSTRUCTED | DNS REGISTRATION IS INSTRUCTED | DNS REGISTRATION IS INSTRUCTED | DNS REGISTRATION IS INSTRUCTED | DNS REGISTRATION IS INSTRUCTED | DNS REGISTRATION IS INSTRUCTED |
| 1013 REGISTRATION RESULT CHECKED BY DATA PROCESSING DEVICE ITSELF | SUCCESS | FAILURE | SUCCESS | FAILURE | SUCCESS | FAILURE |
| 1014 CONTENT DISPLAYED ON OPERATION PANEL | UPDATE OF DNS RECORD IS SUCCEEDED | UPDATE OF DNS RECORD IS SUCCEEDED | UPDATE OF DNS RECORD IS SUCCEEDED | UPDATE OF DNS RECORD IS FAILED | UPDATE OF DNS RECORD IS SUCCEEDED | UPDATE OF DNS RECORD IS FAILED |

DATA PROCESSING DEVICE, REGISTRATION METHOD, AND PROGRAM

BACKGROUND OF THE INVENTION

1. Field of the Invention

The present invention relates to a data processing device, a registration method for registering identification information for identifying the data processing device and an address of the data processing device, and a program for causing a computer to implement the registration method.

2. Description of the Related Art

A data processing device can automatically set an IP address of the data processing device itself while using a dynamic host configuration protocol (DHCP). This system is described, for example, in Japanese Patent Laid-Open No. 2000-244533 and Japanese Patent Laid-Open No. 2004-048462.

In a domain name system (DNS), an IP address and a host name of the data processing device are managed in association with each other. On the basis of this association, a corresponding IP address can be obtained from the host name, and a corresponding host name can be obtained from the IP address. This system is described, for example, in Japanese Patent Laid-Open No. 11-296467.

When the data processing device uses the DHCP, the IP address of the data processing device may be changed dynamically, and therefore the association between the IP address and the host name of the data processing device may also be changed. In that case, the association between the IP address and the host name cannot be managed properly in the DNS.

In view of the above, there is proposed a technology called dynamic DNS for dynamically updating a DNS record indicating the association between the host name and the IP address. In the dynamic DNS, a data processing device notifies a DNS server for managing the DNS record of the host name and the IP address and instructs the DNS server to register the DNS record. Then, the DNS server updates the DNS record in response to the instruction.

It should be noted that the registration of the DNS record cannot be instructed directly to the DNS server in some cases depending on the type of the data processing device. For example, there are cases where the DNS server accepts the registration of the DNS record only from specific devices for improving the security and a case where the DNS server accepts the registration of the DNS record only from devices located within the same domain.

In such cases, the data processing device cannot instruct the registration of the DNS record directly to the DNS server. Therefore, the data processing device sometimes uses an option of DHCP (for example, Option 81) to request a DHCP server to perform the registration of the DNS record with respect to the DNS server.

However, depending on the method of mounting the DHCP server or depending on the type of DHCP server, the DHCP server does not support the specific option (for example, Option 81) in some cases. Alternatively, even when the DHCP server supports the option (for example, Option 81), the data processing device may not be notified properly of the result regarding the registration of the DNS record. In that case, even when the data processing device requests the DHCP server to perform the registration of the DNS record, it is uncertain that the IP address and the host name of the data processing device are registered as the DNS record.

Thus, it is preferable that even when the address of the data processing device is dynamically assigned to the data processing device from the server, the association between identification information for identifying the data processing device and the address of the data processing device should be registered more reliably.

SUMMARY OF THE INVENTION

To solve the above-mentioned problems, according to an aspect of the present invention, the invention provides a data processing device, including: an address obtaining unit that obtains an address of the data processing device from a first server; a request unit that requests the first server to transmit identification information for identifying the data processing device and the address obtained by the address obtaining unit to a second server to register the identification information and the address; and a transmission unit that transmits the identification information for identifying the data processing device and the address obtained by the address obtaining unit to the second server without intermediation of the first server to register the identification information and the address.

In addition, according to another aspect of the present invention, the invention provides a data processing device, including: an address obtaining unit that obtains an address of the data processing device from a DHCP server with use of a DHCP; a request unit that requests the DHCP server to register identification information for identifying the data processing device and the address obtained by the address obtaining unit in a DNS; and a registration unit that registers in the DNS the identification information for identifying the data processing device and the address obtained by the address obtaining unit without intermediation of the DHCP server.

Furthermore, according to still another aspect of the present invention, the invention provides a registration method of registering identification information for identifying a data processing device and an address of the data processing device, including the steps of: making a request from the data processing device to a first server for causing the first server to transmit the identification information for identifying the data processing device and an address assigned to the data processing device by the first server to a second server to register the identification information and the address; and transmitting from the data processing device to the second server the identification information for identifying the data processing device and the address assigned to the data processing device by the first server without intermediation of the first server to register the identification information and the address.

Moreover, according to a further aspect of the present invention, the invention provides a registration method of registering identification information for identifying a data processing device and an address of the data processing device in a DNS, including the steps of: making a request from the data processing device to a DHCP server for causing the DHCP server to register in the DNS the identification information for identifying the data processing device and an address assigned with use of a DHCP to the data processing device; and registering in the DNS the identification information for identifying the data processing device and the address assigned to the data processing device with use of the DHCP, without intermediation of the DHCP server.

Further features of the present invention will become apparent from the following description of exemplary embodiments with reference to the attached drawings.

BRIEF DESCRIPTION OF THE DRAWINGS

FIG. 8 is a sequence diagram showing the data processing method according to the present invention.

FIG. 9 is a flowchart for the data processing executed by the data processing device.

FIG. 10 is a table in which operations of the data processing device are summarized.

FIG. 11 is a table in which the operations of the data processing device are summarized.

DESCRIPTION OF THE EMBODIMENTS

Hereinafter, a description will be given of embodiments according to the present invention with reference to the attached drawings.

First Embodiment

Figure 1:
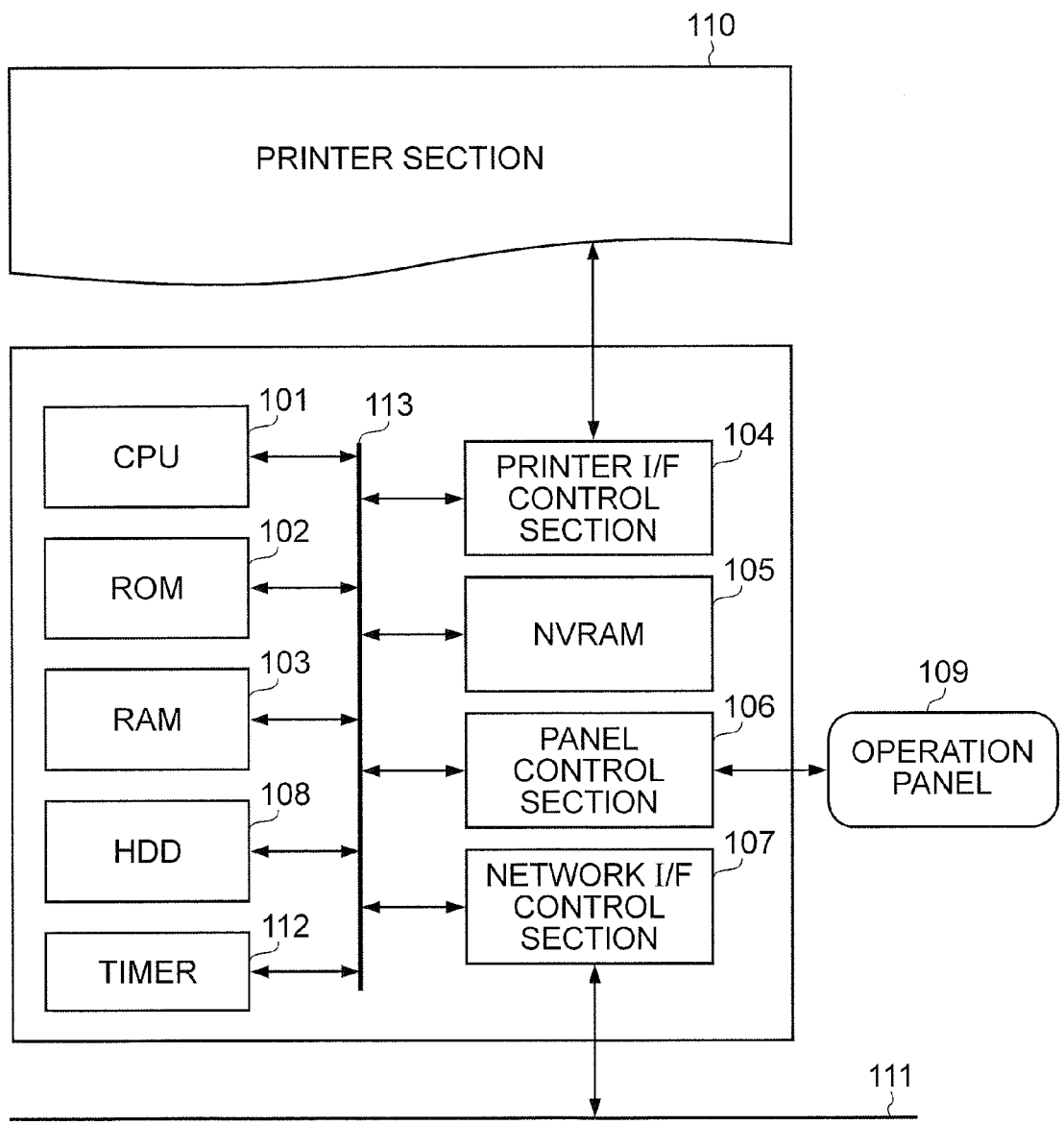
FIG. 1 is a block diagram showing a hardware construction of a data processing device according to the present invention.

FIG. 1 is a block diagram showing a hardware construction of a data processing device according to the present invention. Herein, a printing device is described as an example of the data processing device. The data processing device may be a network device, such as a multifunction device, a copying device, and a facsimile device, other than the printing device.

A CPU 101 controls the entirety of the data processing device by executing a software program of the data processing device. A ROM 102 is a read only memory (storage medium). The ROM 102 stores a boot program, fixed parameters, and the like of the data processing device. A RAM 103 is a random access memory (storage medium). The CPU 101 stores temporal data in the RAM 103 when the entirety of the data processing device is controlled.

A printer I/F control section 104 controls a printer section 110 to transmit image data to the printer section 110 and receive status information from the printer section 110. The printer section 110 prints images based on the image data on a sheet or the like.

An NVRAM 105 is a non-volatile memory (storage medium). The NVRAM 105 stores various setting values related to the data processing device.

A panel control section 106 controls an operation panel 109 for causing the operation panel 109 to display various types of information, and also receives information or instructions input from the operation panel 109. The operation panel 109 displays the various types of information and inputs information or instructions from a user.

A network I/F control section 107 controls data transmission/reception with respect to a LAN 111. The LAN 111 is a local area network, which functions as a communication medium for connecting the data processing device with other external devices. The LAN 111 may be a wireless network instead of a wired network. In addition, another communication medium may be used as a substitute for the LAN 111.

A HDD 108 is a hard disk drive. The HDD 108 stores various data including print data. A timer 112 is used for controlling elapsing time.

A bus 113 is a system bus for forwarding control signals from the CPU 101 and data signals exchanged between any devices. Connected to the bus 113 are the CPU 101, the ROM 102, the RAM 103, the printer I/F control section 104, the NVRAM 105, the panel control section 106, the network I/F control section 107, the HDD 108, and the timer 112.

Figure 2:
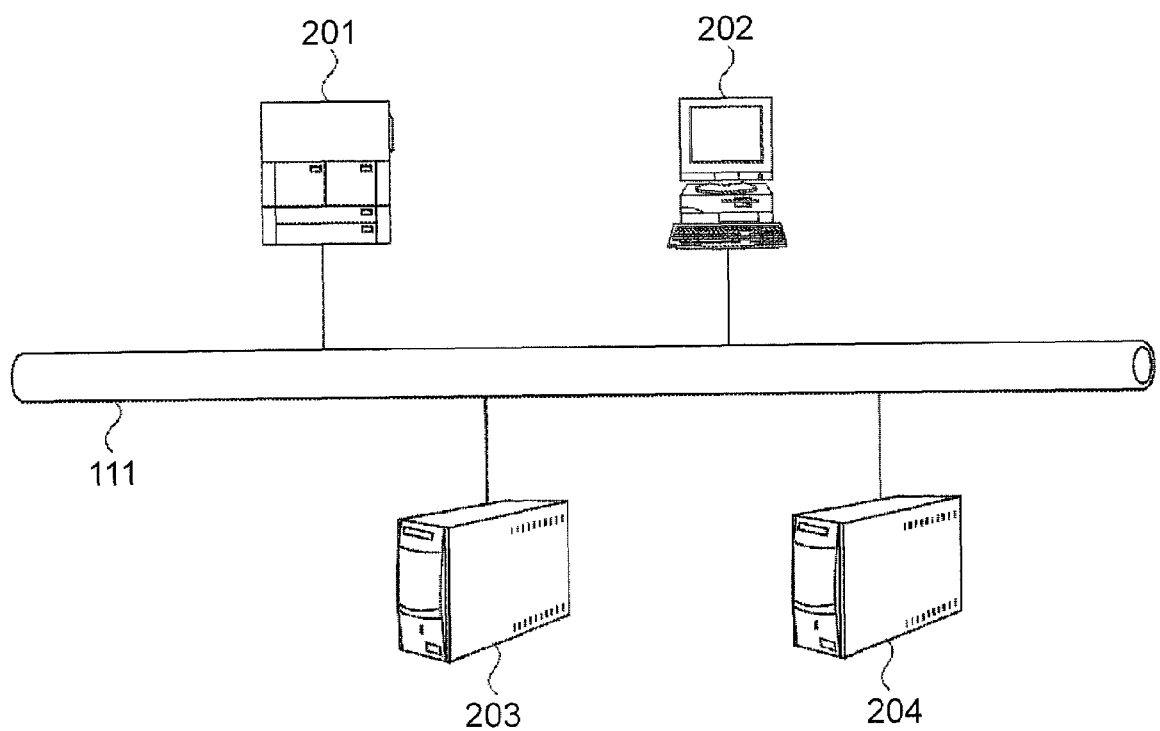
FIG. 2 shows an entire configuration of a network system according to the present invention.

FIG. 2 shows an entire configuration of a network system according to the present invention. A data processing device 201 is a printing device capable of performing printing process and the like. FIG. 1 shows the hardware construction of the data processing device 201.

A client PC 202 is a computer capable of executing an application. Data created on the basis of the application is converted into print data by a printer driver on the client PC 202, and the client PC 202 transmits the print data to the data processing device 201. Then, the data processing device 201 performs the printing process based on the print data.

A DNS server 203 is a server having a domain name system (DNS) function. The DNS function provides a service for obtaining a corresponding IP address from a host name. The DNS server 203 manages a database in which the association between a host name and an IP address is described (hereinafter, referred to as DNS database). In response to a request from the device, the IP address can be looked up from the host name.

A DHCP server 204 is a server having a dynamic host configuration protocol (DHCP) function. The DHCP function provides a service for dynamically assigning an IP address to a device on the LAN. When a certain device is logged in to the network, the DHCP server 204 assigned to the device an IP address among the IP addresses previously prepared.

At the time of booting, the data processing device 201 is assigned with an IP address and a host name from the DHCP server 204. Then, the data processing device 201 makes such a request to the DHCP server 204 that a DNS record in the DNS database of the DNS server 203 should be updated with the IP address and the host name assigned by the DHCP server 204. The DHCP server 204 follows the request from the data processing device 201 to instruct the DNS server 203 to update the DNS record.

In addition, when the data processing device 201 is assigned with the IP address and the host name by the DHCP server 204, the data processing device 201 by itself instructs the DNS server 203 to update the DNS record with the IP address and the host name assigned by the DHCP server 204.

After that, the client PC can obtain the IP address of the data processing device 201 from the host name of the data processing device 201 by using the DNS server 203, and transmit the print data to the IP address thus obtained. Thus, even when the client PC is not informed of the IP address of the destination of the print data, the client PC can transmit the print data to the destination on the basis of the host name, which is designated as the destination.

Figure 3:
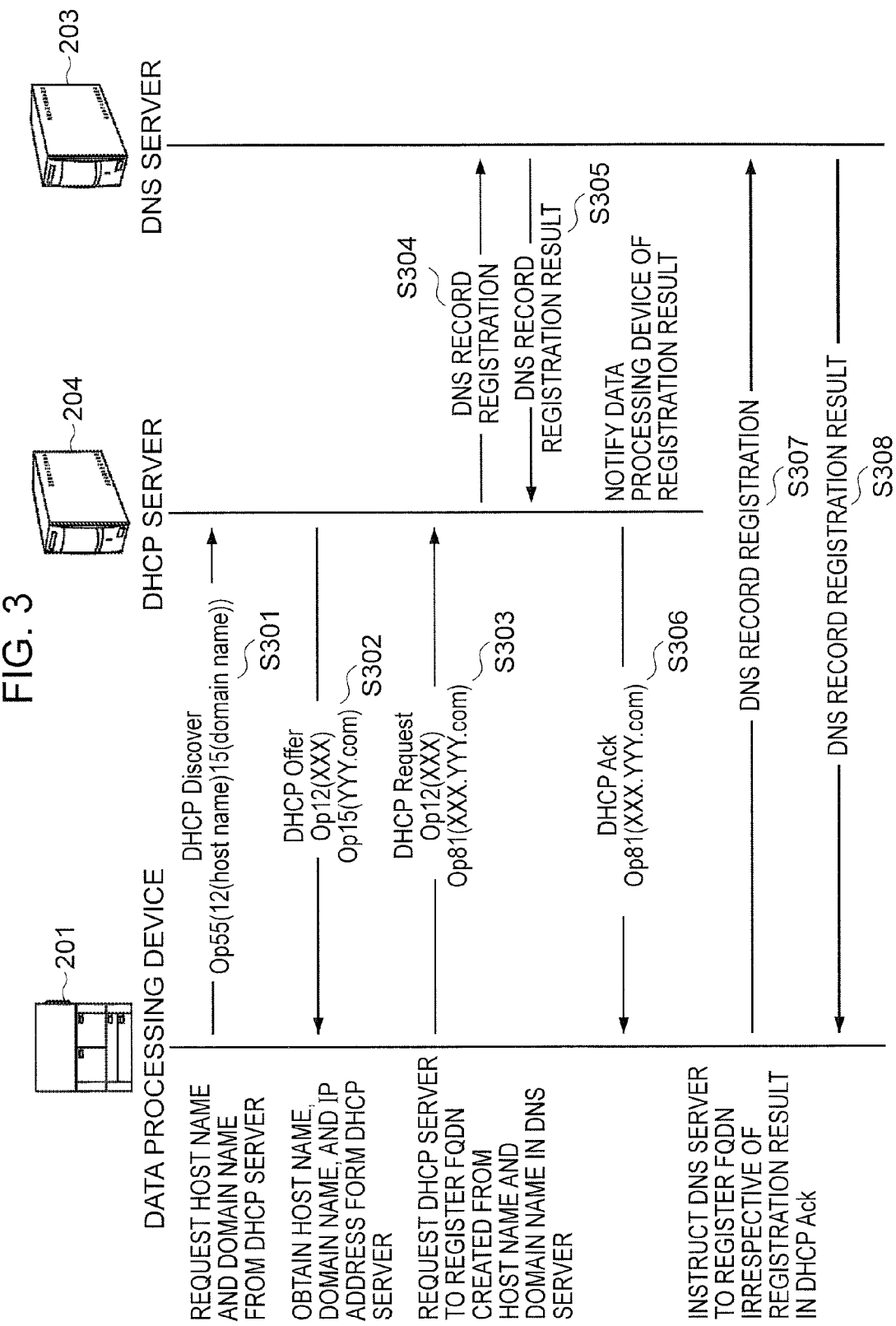
FIG. 3 is a sequence diagram for a data processing method according to the present invention.

FIG. 3 is a sequence diagram for a data processing method according to the present invention. According to this data processing method, when the data processing device 201 is assigned with the IP address and the host name by the DHCP server 204, the data processing device 201 makes a request to the DHCP server 204 regarding the registration of the IP address and the host name for the DNS record. At the same time, the data processing device 201 itself instructs the DNS server 203 to register the IP address and the host name directly.

The data processing device 201 transmits DHCP Discover to the DHCP server 204 as an obtaining request for obtaining a host name, a domain name, and an IP address (Step S301). The DHCP server 204 transmits DHCP Offer to the data processing device 201 to assign a host name, a domain name, an IP address, and the like to the data processing device 201 in response to the DHCP Discover (Step S302). Herein, the IP address assigned to the data processing device 201 is "1.2.3.4", the host name assigned to the data processing device 201 is "xxx", and the domain name assigned to the data processing device 201 is "YYY.com".

The data processing device 201 having received the host name, the domain name, the IP address, and the like creates a fully qualified domain name (FQDN) from the host name and the domain name. Then, the data processing device 201 makes such a request to the DHCP server 204 that the DHCP server 204 registers this FQDN in the DNS server 203 as a host name associated with the IP address that is assigned to the data processing device 201. For this reason, the data processing device 201 transmits DHCP Request to the DHCP server 204 (Step S303). It should be noted that the FQDN refers to a description format in which any domain name is not omitted after the host name to specify the complete name. Herein, the FQDN is "xxx.YYY.com".

In response to the DHCP Request, the DHCP server 204 instructs the DNS server 203 to register the IP address and the host name of the data processing device 201 as the DNS record (Step S304). The DNS server 203 transmits the registration result to the DHCP server 204 as a reply (Step S305). The DNS server 203 then registers the IP address and the host name of the data processing device 201 as the DNS record, and when the registration is successful, the DNS server 203 transmits this information about the success to the DHCP server 204. If the registration fails, the DNS server 203 transmits this information about the failure to the DHCP server 204. Furthermore, the DHCP server 204 transmits DHCP Ack to the data processing device 201 to notify the data processing device 201 of the registration result (Step S306).

Thus far, the case where the DHCP server 204 has the function of instruction the DNS server to register the IP address and the host name as the DNS record (hereinafter, referred to as DNS registration function) has been described. However, depending on the type of DHCP server, there are such cases where the DHCP server does not have the DNS registration function and where the DHCP server actually has the DNS registration function but does not transmit the registration result properly.

In order to cope with these cases, the data processing device 201 itself instructs the DNS server 203 to register the IP address and the created FQDN of the data processing device 201 as the DNS record (Step S307) irrespective of the content of the DHCP Ack. In response to the instruction, the DNS server 203 registers in the DNS database the IP address and the FQDN of the data processing device 201 as the DNS record and also transmits the registration result to the data processing device 201 (Step S308).

After that, the data processing device 201 makes a judgment on the content of the DHCP Ack in S306 and the content of the registration result in S308 in a comprehensive manner to display on the operation panel 109 information indicating the result of the registration with respect to DNS server 203.

Figure 4:
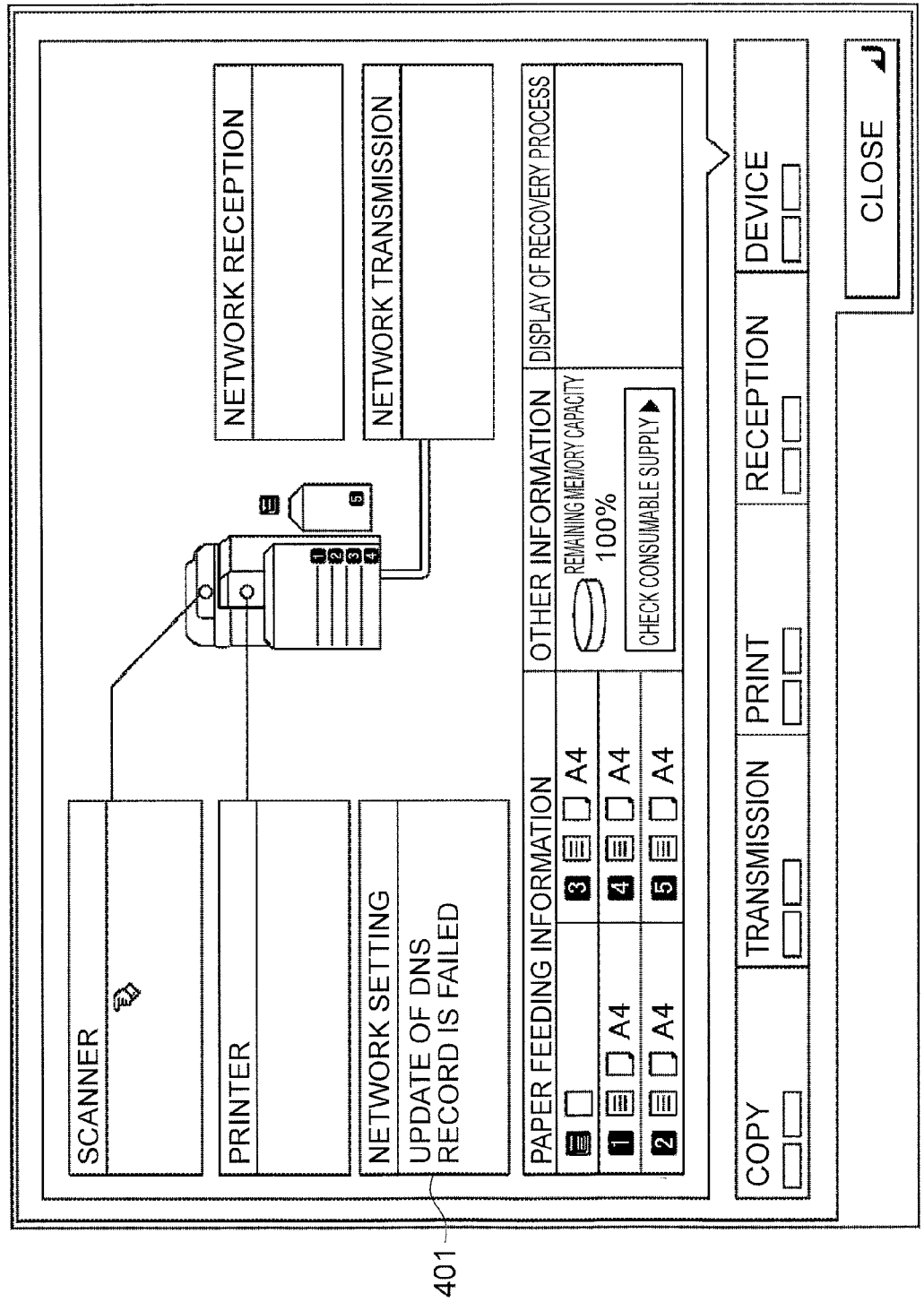
FIG. 4 shows an operation panel for displaying information regarding a registration result.

FIG. 4 shows an operation panel 109 that displays information on a registration result. An area denoted by 401 is used for displaying that the update of the DNS record has failed. When the registration result is success, a message "the update of the DNS record is successful" may be displayed or no message may be displayed alternatively.

Figure 5:
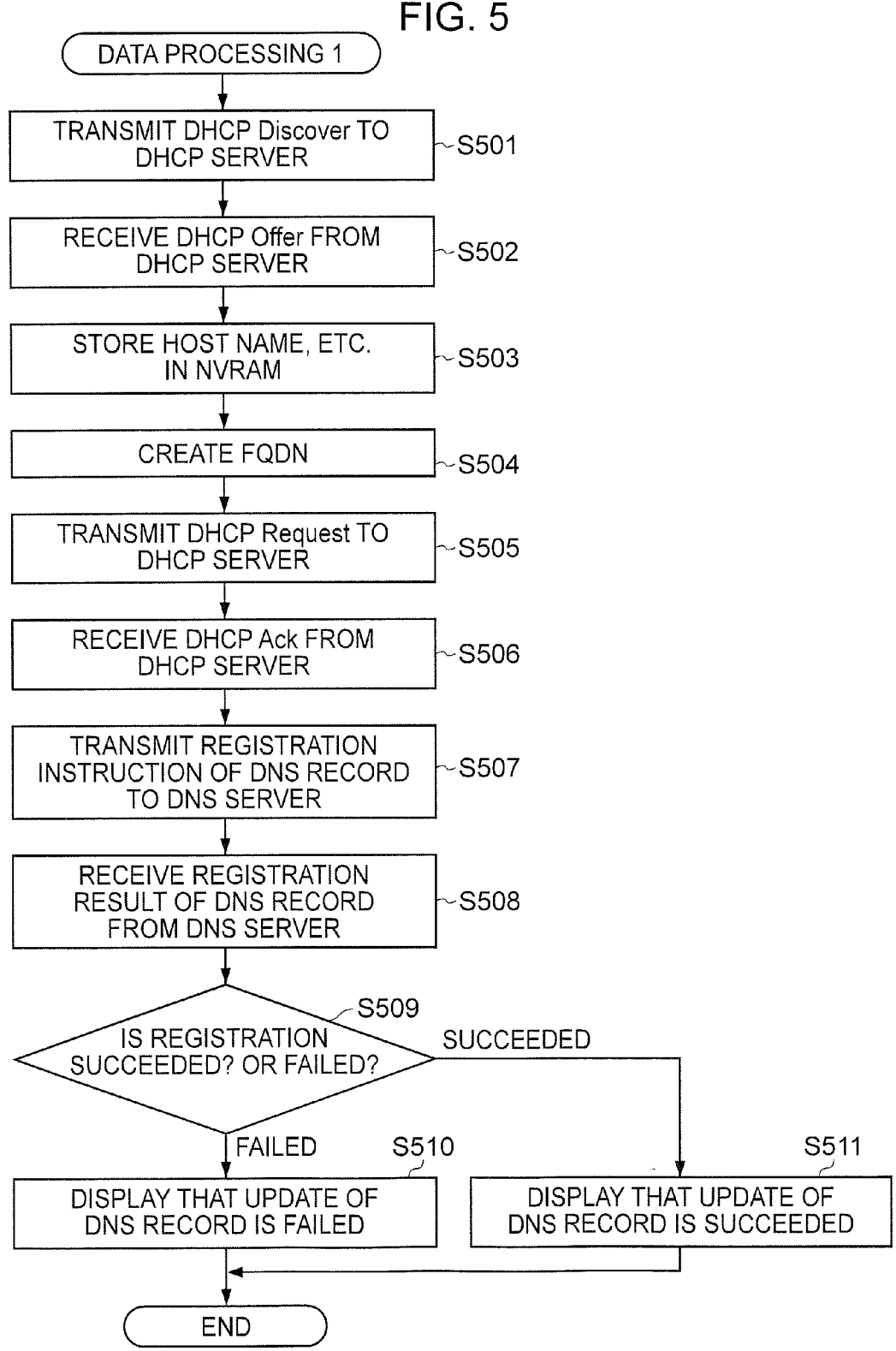
FIG. 5 is a flowchart for data processing executed by a data processing device.

FIG. 5 is a flowchart for data processing executed by the data processing device 201. When the CPU 101 of the data processing device 201 executes a program based on the flowchart of FIG. 5, this data processing is executed.

First of all, the data processing device 201 transmits the DHCP Discover to the DHCP server 204 (Step S501). With the DHCP Discover, Option 12 for requesting the host name and Option 15 for requesting the domain name are specified.

Next, the data processing device 201 receives the DHCP Offer from the DHCP server 204 (Step S502). In this DHCP Offer, a host name, a domain name, an IP address, and the like that are assigned to the data processing device 201 are included. Herein, the IP address assigned to the data processing device 201 is "1.2.3.4", the host name assigned to the data processing device 201 is "xxx", and the domain name assigned to the data processing device 201 is "YYY.com". Furthermore, the IP address of the DNS server 203 is also included in this DHCP Offer.

When the data processing device 201 receives the DHCP Offer, to set the host name, the domain name, and the IP address in the DHCP Offer as the setting values for the data processing device 201, the data processing device 201 stores the host name, the domain name, and the IP address in the NVRAM (Step S503). Then, to specify which DNS server the data processing device uses by itself, the data processing device also stores in the NVRAM the IP address of the DNS server included in the DHCP Offer.

Next, the data processing device 201 creates the FQDN (Step S504). The FQDN is created by connecting the host name and the domain name to each other. Herein, the FQDN is "xxx.YYY.com".

When the data processing device 201 creates the FQDN, in order to register the FQDN in the DNS server 203, the data processing device 201 transmits the DHCP Request to the DHCP server 204 (Step S505). In the DHCP Request, Option 81 is specified for requesting the DHCP server 204 to perform the registration with respect to the DNS server 203. Also, in the DHCP Request, the FQDN created in Step S504 and the IP address assigned to the data processing device 201 are included.

When the DHCP server 204 receives the DHCP Request, the DHCP server 204 extracts the FQDN and the IP address in the DHCP Request to transmit the registration instruction of the DNS record including the FQDN and the IP address thus extracted to the DNS server 203. When the DHCP server 204 receives the registration result of the DNS record from the DNS server 203, the DHCP server 204 transmits the DHCP Ack to the data processing device 201.

The data processing device 201 receives the DHCP Ack corresponding to the DHCP Request from the DHCP server 204 (Step S506). In the DHCP Ack, information indicating the registration result of the DNS record (success or failure) is included.

Subsequently, the data processing device 201 transmits the registration instruction of the DNS record to the DNS server 203 (Step S507). At this time, the data processing device 201 transmits the registration instruction in accordance with the IP address of the DNS server in the DHCP Offer received in Step S502. In this registration instruction, the FQDN created in Step S504 and the IP address assigned to the data processing device 201 are included.

The data processing device 201 receives information indicating the registration result (success of failure) associated with the registration instruction from the DNS server 203 (Step S508).

Lastly, on the basis of the information indicating the registration result in the DHCP Ack and the information indicating the registration result received in Step S508, judgment is made in a comprehensive way as to whether the registration with respect to the DNS server 203 has been successful or failed (Step S509). A method for the comprehensive judgment will be described with reference to FIG. 11.

When the registration with respect to the DNS server 203 has failed, the data processing device 201 displays on the operation panel that the update of the DNS record has failed (Step S510). FIG. 4 shows an example of the display image displayed in Step S510. When the registration with respect to the DNS server 203 is successful, the data processing device 201 displays that the update of the DNS record has succeeded (Step S511). It should be noted that no message may be displayed in Step S511.

Second Embodiment

In the first embodiment, irrespective of the content of the registration result in the DHCP Ack of S306, the data processing device 201 by itself instructs the DNS server 203 to perform the registration of the FQDN and the IP address. On the other hand, in a second embodiment, when the registration result in the DHCP Ack indicates success, the data processing device 201 does not transmit the registration instruction of the DNS record to the DNS server 203.

Hereinafter, a description will be given of the second embodiment. The hardware construction of the data processing device and the entire configuration of the network system are common to those in the first embodiment, and therefore the description given with reference to FIGS. 1 and 2 will be omitted here.

Figure 6:
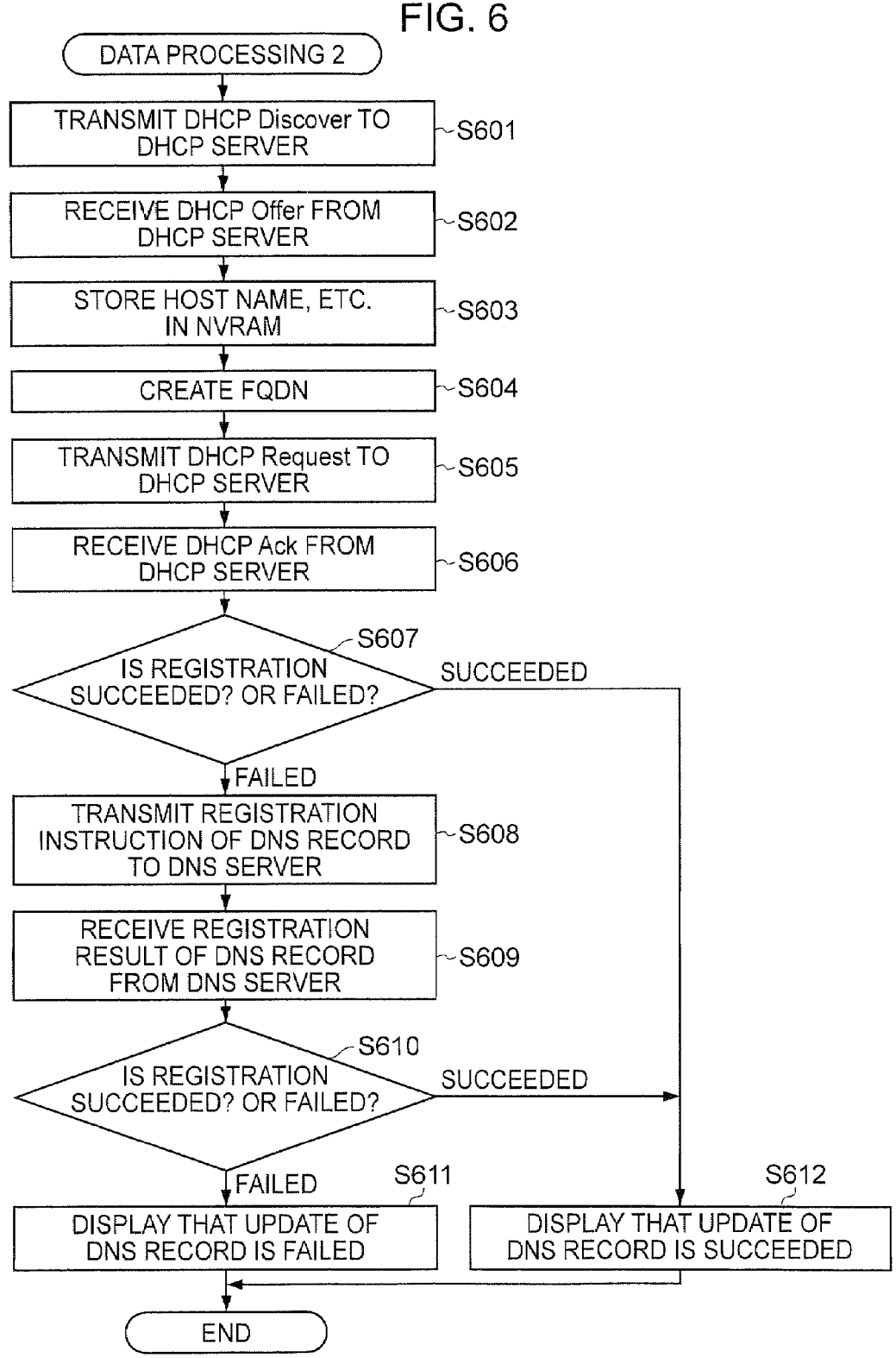
FIG. 6 is a flowchart for the data processing executed by the data processing device.

FIG. 6 is a flowchart for data processing executed by the data processing device 201. When the CPU 101 of the data processing device 201 executes a program based on the flowchart of FIG. 6, this data processing is executed.

First of all, the data processing device 201 transmits the DHCP Discover to the DHCP server 204 (Step (S601). In this the DHCP Discover, Option 12 for requesting the host name and Option 15 for requesting the domain name are specified.

Next, the data processing device 201 receives the DHCP Offer from the DHCP server 204 (Step S602). In this DHCP Offer, a host name, a domain name, an IP address, and the like that are assigned to the data processing device 201 are included. Herein, the IP address assigned to the data processing device 201 is "1.2.3.4", the host name assigned to the data processing device 201 is "xxx", and the domain name assigned to the data processing device 201 is "YYY.com". Furthermore, the IP address of the DNS server 203 is included in this DHCP Offer as well.

When the data processing device 201 receives the DHCP Offer, to set the host name, the domain name, and the IP address in the DHCP Offer as the setting values for the data processing device 201, the data processing device 201 stores the host name, the domain name, and the IP address in the NVRAM (Step S603). Then, to specify which DNS server the data processing device uses by itself, the data processing device also stores in the NVRAM the IP address of the DNS server included in the DHCP Offer.

Next, the data processing device 201 creates the FQDN (Step S604). The FQDN is created by connecting the host name and the domain name to each other. Herein, the FQDN is "xxx.YYY.com".

When the data processing device 201 creates the FQDN, in order to register the FQDN in the DNS server 203, the data processing device 201 transmits the DHCP Request to the DHCP server 204 (Step S605). In the DHCP Request, Option 81 is specified for requesting the DHCP server 204 to perform the registration with respect to the DNS server 203. Also, in the DHCP Request, the FQDN created in Step S604 and the IP address assigned to the data processing device 201 are included.

When the DHCP server 204 receives the DHCP Request, the DHCP server 204 extracts the FQDN and the IP address in the DHCP Request to transmit the registration instruction of the DNS record including the FQDN and the IP address thus extracted to the DNS server 203. When the DHCP server 204 receives the registration result of the DNS record from the DNS server 204, the DHCP server 204 transmits the DHCP Ack to the data processing device 201.

The data processing device 201 receives the DHCP Ack corresponding to the DHCP Request from the DHCP server 204 (Step S606). In the DHCP Ack, information indicating the registration result of the DNS record (success or failure) is included.

Here, the data processing device 201 judges whether or not the registration with respect to the DNS server has succeeded on the basis of the information indicating the registration result in the DHCP Ack (Step S607). When the registration with respect to the DNS server has succeeded, the flow advances to Step S612.

When the registration with respect to the DNS server has failed, the data processing device 201 transmits the registration instruction of the DNS record to the DNS server 203 directly (Step S608). At this time, the data processing device 201 transmits the registration instruction while following the IP address of the DNA server in the DHCP Offer received in Step S602. In this registration instruction, the FQDN created in Step S604 and the IP address assigned to the data processing device 201 are included.

The data processing device 201 receives information indicating the registration result (success or failure) associated with the registration instruction from the DNS server 203 (Step S609).

Lastly, the data processing device 201 judges whether or not the registration with respect to the DNS server 203 is successful (Step S610) on the basis of the information indicating the registration result received in Step S609.

When the registration with respect to the DNS server 203 has failed, the data processing device 201 displays on the operation panel that the update of the DNS record has failed (Step S611). FIG. 4 shows an example of the display image displayed in Step S611. When the registration with respect to the DNS server 203 is successful, the data processing device 201 displays that the update of the DNS record has succeeded (Step S612). It should be noted that in Step S612, no message may be displayed.

When the registration with respect to the DNS server 203 by the DHCP server 204 has succeeded, the data processing device 201 may not perform the registration with respect to the DNS server, the processing load on the data processing device 201 is alleviated, and therefore the communication traffic on the network is also reduced.

Third Embodiment

Depending on the type of DHCP sever, the DNS registration function may not be prepared. Some DHCP servers transmit the DHCP Ack to which Option 81 is not specified, in response to the DHCP Request to which Option 81 is specified. Thus, when the data processing device 201 checks whether or not Option 81 is specified to the DHCP Ack, it is possible to clearly find out whether the DHCP server has the DNS registration function or not.

In view of the above, in a third embodiment, the data processing device 201 judges whether or not the DHCP server 204 makes a registration request to the DNS server 203 on the basis of the content of the DHCP Ack. When the registration function is not available, the data processing device 201 transmits the registration instruction of the DNS record to the DNS server 203.

Hereinafter, a description will be given of the third embodiment. The hardware construction of the data processing device and the entire configuration of the network system are common to those in the first embodiment, and therefore the description given with reference to FIGS. 1 and 2 will be omitted here.

Figure 7:
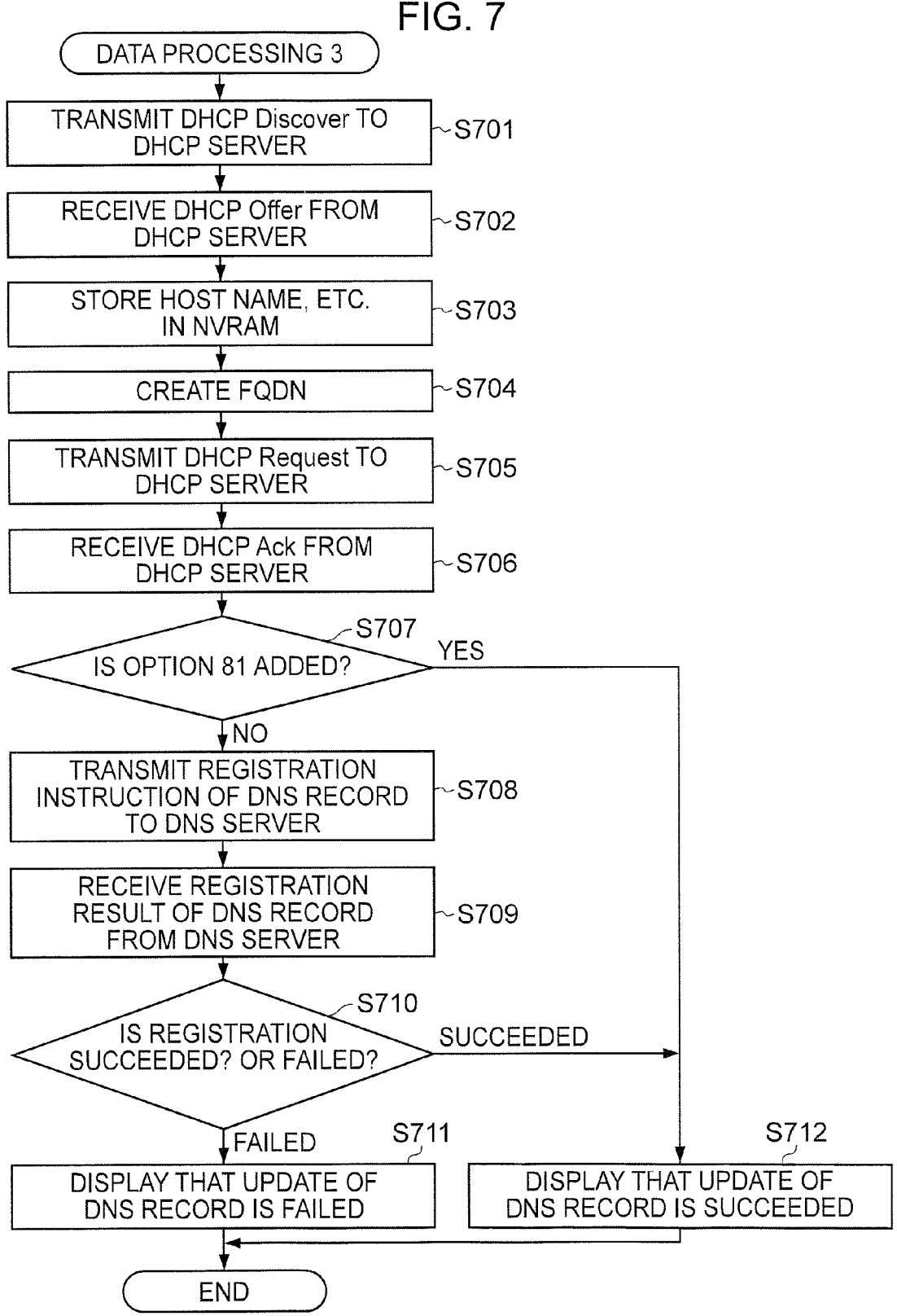
FIG. 7 is a flowchart for the data processing executed by the data processing device.

FIG. 7 is a flowchart for data processing executed by the data processing device 201. When the CPU 101 of the data processing device 201 executes a program based on the flowchart of FIG. 7, this data processing is executed.

First of all, the data processing device 201 transmits the DHCP Discover to the DHCP server 204 (Step S701). In this the DHCP Discover, Option 12 for requesting the host name and Option 15 for requesting the domain name are specified.

Next, the data processing device 201 receives the DHCP Offer from the DHCP server 204 (Step S702). In this DHCP Offer, a host name, a domain name, an IP address, and the like that are assigned to the data processing device 201 are included. Herein, the IP address assigned to the data processing device 201 is "1.2.3.4", the host name assigned to the data processing device 201 is "xxx", and the domain name assigned to the data processing device 201 is "YYY.com". Furthermore, the IP address of the DNS server 203 is also included in this DHCP Offer.

When the data processing device 201 receives the DHCP Offer, to set the host name, the domain name, and the IP address in the DHCP Offer as the setting values for the data processing device 201, the data processing device 201 stores the host name, the domain name, and the IP address in the NVRAM (Step S703). Then, to specify which DNS server the data processing device uses by itself, the data processing device also stores in the NVRAM the IP address of the DNS server in the DHCP Offer.

Next, the data processing device 201 creates the FQDN (Step S704). The FQDN is created by connecting the host name and the domain name to each other. Herein, the FQDN is "xxx.YYY.com".

When the data processing device 201 creates the FQDN, in order to register the FQDN in the DNS server 203, the data processing device 201 transmits the DHCP Request to the DHCP server 204 (Step S705). In the DHCP Request, Option 81 is specified for requesting the DHCP server 204 to perform the registration with respect to the DNS server 203. Also, the FQDN created in Step S704 and the IP address assigned to the data processing device 201 are included in the DHCP Request.

In the case where the DHCP server 204 has the DNS registration function, when the DHCP server 204 receives the DHCP Request, the FQDN and the IP address in the DHCP Request are extracted. Then, the DHCP server 204 transmits the registration instruction of the DNS record including the FQDN and the IP address thus extracted to the DNS server 203. After that, when the DHCP server 204 receives the registration result of the DNS record from the DNS server 203, the DHCP server 204 transmits the DHCP Ack to the data processing device 201. At this time, Option 81 is added to the DHCP Ack. It should be noted that, even when the DHCP server 204 has the DNS registration function, if the registration result of the DNS record indicates failure, Option 81 is not added to the DHCP Ack.

When the DHCP server 204 does not have the DNS registration function, in response to the DHCP Request, the DHCP server 204 transmits the DHCP Ack to the data processing device 201 as a reply, but Option 81 is not added to this the DHCP Ack.

The data processing device 201 receives the DHCP Ack corresponding to the DHCP Request from the DHCP server 204 (Step S706).

Here, the data processing device 201 judges whether or not the Option 81 is added to the DHCP Ack (Step S707). When Option 81 is added to the DHCP Ack, the flow advances to Step S712.

When Option 81 is not added to the DHCP Ack, the data processing device 201 transmits the registration instruction of the DNS record to the DNS server 203 (Step S708). At this time, the data processing device 201 transmits the registration instruction while following the IP address of the DNA server in the DHCP Offer received in Step S702. In this registration instruction, the FQDN created in Step S704 and the IP address assigned to the data processing device 201 are included.

The data processing device 201 receives information indicating the registration result (success or failure) associated with the registration instruction from the DNS server 203 (Step S709).

Lastly, the data processing device 201 judges whether or not the registration with respect to the DNS server 203 has succeeded on the basis of the information indicating the registration result received in Step S709, (Step S710).

When the registration with respect to the DNS server 203 has failed, the data processing device 201 displays on the operation panel that the update of the DNS record has failed (Step S711). FIG. 4 shows an example of the display image displayed in Step S711. When the registration with respect to the DNS server 203 is successful, the data processing device 201 displays that the update of the DNS record has succeeded (Step S712). It should be noted that no message may be displayed in Step S712.

Fourth Embodiment

In the first and second embodiments, the DHCP server 204 transmits the DHCP Ack including the registration result to the data processing device 201. However, depending on the type of DHCP server, some DHCP servers actually transmit the DHCP Ack but do not include the registration result in the DHCP Ack.

In view of the above, in a fourth embodiment, the data processing device 201 searches for the DNS record to judge whether the DNS record based on the FQDN and the IP address of the data processing device 201 is registered. When such a DNS record is not registered, the data processing device 201 transmits the registration instruction of the DNS record to the DNS server 203.

Hereinafter, a description will be given of the fourth embodiment. The hardware construction of the data processing device and the entire configuration of the network system are common to those in the first embodiment, and therefore the description given with reference to FIGS. 1 and 2 will be omitted here.

FIG. 8 is a sequence diagram for a data processing method according to the fourth embodiment.

The data processing device 201 transmits the DHCP Discover to the DHCP server 204 as an obtaining request for obtaining a host name, a domain name, and an IP address (Step S801). The DHCP server 204 transmits the DHCP Offer to the data processing device 201 in response to the DHCP Discover to assign the host name, the domain name, the IP address, and the like to the data processing device 201 (Step S802). Herein, the IP address assigned to the data processing device 201 is "1.2.3.4", the host name assigned to the data processing device 201 is "xxx", and the domain name assigned to the data processing device 201 is "YYY.com".

The data processing device 201 having received the host name, the domain name, the IP address, and the like creates a fully qualified domain name (FQDN) from the host name and the domain name. Then, the data processing device 201 requests the DHCP server 204 to register this FQDN in the DNS server 203 as a host name associated with the IP address that is assigned to the data processing device 201. For that reason, the data processing device 201 transmits the DHCP Request to the DHCP server 204 (Step S803). It should be noted that the FQDN refers to a description format in which the domain name is not omitted after the host name to specify the complete name. Herein, the FQDN is "xxx.YYY.com".

In response to the DHCP Request, the DHCP server 204 instructs the DNS server 203 to register the IP address and the host name of the data processing device 201 as the DNS record (Step S804). The DNS server 203 transmits the registration result to the DHCP server 204 as a reply (Step S805). The DNS server 203 then registers the IP address and the host name of the data processing device 201 as the DNS record. When the registration has succeeded, the DNS server 203 transmits information on the registration success to the DHCP server 204. When the registration has failed, the DNS server 203 transmits information on the registration failure to the DHCP server 204.

Here, the DHCP server 204 transmits the DHCP Ack to the data processing device 201 as a reply to the DHCP Request, but does not notify the data processing device 201 of the registration result (Step S806).

Therefore, after receiving the DHCP Ack, the data processing device 201 inquires with the DNS server 203 as to whether the IP address and the host name of the data processing device 201 itself are registered (corresponding to the FQDN created by the data processing device 201) (Step S807). In response to the inquiry, the DNS server 203 searches for the DNS record and transmits the search result to the data processing device 201 (Step S808).

For example, the data processing device 201 transmits the IP address of the data processing device 201 itself to the DNS server 203, and the DNS server 203 searches for the DNS record that is associated with the IP address. When the DNS record associated with the IP address exists, the DNS server 203 transmits the host name associated with the IP address to the data processing device 201 as the search result. When the DNS record associated with the IP address does not exist, the DNS server 203 transmits information on the search result to the data processing device 201 indicating that the IP address is not registered.

The data processing device 201 receives the search result of S808 and then performs subsequent processing while following the content of the search result. When the search result indicates that the IP address and the host name of the data processing device 201 are not registered, the data processing device 201 by itself instructs the DNS server 203 to register the IP address and the FQDN as the DNS record (Step S809). In response to the instruction, the DNS server 203 registers the IP address and the FQDN of the data processing device 201 as the DNS record in the DNS database and also transmits the registration result to the data processing device 201 (Step S810).

On the other hand, when the search result indicates that the IP address and the host name of the data processing device 201 are registered, processing of S809 and S810 is not executed.

After that, the data processing device 201 makes a judgment in a comprehensive manner on the search result and the content of S808 and the registration result of S810 to display information on the result of the registration with respect to the DNS server 203 on the operation panel 109.

FIG. 9 is a flowchart for data processing executed by the data processing device 201. When the CPU 101 of the data processing device 201 executes a program based on the flowchart of FIG. 9, this data processing is executed.

First of all, the data processing device 201 transmits the DHCP Discover to the DHCP server 204 (Step S901). In this the DHCP Discover, Option 12 for requesting the host name and Option 15 for requesting the domain name are specified.

Next, the data processing device 201 receives the DHCP Offer from the DHCP server 204 (Step S902). In this DHCP Offer, a host name, a domain name, an IP address, and the like that are assigned to the data processing device 201 are included. Herein, the IP address assigned to the data processing device 201 is "1.2.3.4", the host name assigned to the data processing device 201 is "xxx", and the domain name assigned to the data processing device 201 is "YYY.com". Furthermore, the IP address of the DNS server 203 is also included in this DHCP Offer.

When the data processing device 201 receives the DHCP Offer, to set the host name, the domain name, and the IP address in the DHCP Offer as the setting values for the data processing device 201, the data processing device 201 stores the host name, the domain name, and the IP address in the NVRAM (Step S903). Then, to specify which DNS server the data processing device uses by itself, the data processing device also stores in the NVRAM, the IP address of the DNS server in the DHCP Offer.

Next, the data processing device 201 creates the FQDN (Step S904). The FQDN is created by connecting the host name and the domain name to each other. Herein, the FQDN is "xxx.YYY.com".

When the data processing device 201 creates the FQDN, in order to register the FQDN in the DNS server 203, the data processing device 201 transmits the DHCP Request to the DHCP server 204 (Step S905). In the DHCP Request, Option 81 is specified for requesting the DHCP server 204 to perform the registration with respect to the DNS server 203. Also, in the DHCP Request, the FQDN created in Step S904 and the IP address assigned to the data processing device 201 are included.

When the DHCP server 204 receives the DHCP Request, the DHCP server 204 extracts the FQDN and the IP address in the DHCP Request to transmit the registration instruction of the DNS record including the FQDN and the IP address thus extracted to the DNS server 203. When the DHCP server 204 receives the registration result of the DNS record from the DNS server 203, the DHCP server 204 transmits the DHCP Ack to the data processing device 201.

The data processing device 201 receives the DHCP Ack corresponding to the DHCP Request from the DHCP server 204 (Step S906). In this the DHCP Ack, there is no information on the registration result of the DNS record (success of failure).

Here, the data processing device 201 inquires with the DNS server 203 as to whether the IP address and the FQDN created in Step S904 of the data processing device 201 are registered as the DNS record. Then, the data processing device 201 transmits the IP address of the data processing device 201 itself or the search instruction including the FQDN created in Step S904 to the DNS server 203 (Step S907). In response to the search instruction, the DNS server 203 searches for the corresponding DNS record to transmit the search result to the data processing device 201.

The data processing device 201 receives the search result from the DNS server 203 (Step S908). Then, on the basis of the content of the search result, the data processing device 201 judges whether the IP address of the data processing device 201 itself and the FQDN created in Step S904 are registered as the DNS record (Step S909).

When the IP address of the data processing device 201 itself and the FQDN created in Step S904 are registered, the flow shifts to Step S914.

When the IP address of the data processing device 201 itself and the FQDN created in Step S904 are not registered, the data processing device 201 transmits the registration instruction of the DNS record to the DNS server 203 (Step S910). At this time, the data processing device 201 transmits the registration instruction while following the IP address of the DNS server in the DHCP Offer received in Step S902. In this registration instruction, the FQDN created in Step S904 and the IP address assigned to the data processing device 201 are included.

The data processing device 201 receives information indicating the registration result (success or failure) associated with the registration instruction from the DNS server 203 (Step S911).

Lastly, the data processing device 201 judges whether or not the registration with respect to the DNS server 203 has succeeded on the basis of the information indicating the registration result received in Step S911 (Step S912).

When the registration with respect to the DNS server 203 has failed, the data processing device 201 displays on the operation panel that the update of the DNS record has failed (Step S913). FIG. 4 shows an example of the display image displayed in Step S913. When the registration with respect to the DNS server 203 has succeeded, the data processing device 201 displays that the update of the DNS record is successful (Step S914). It should be noted that no message may be displayed in Step S914.

Other Embodiments

In the second embodiment, the description has been given of a DHCP server having the DNS registration function in which the DHCP Ack indicates whether the registration with respect to the DNS server has succeeded. In the third embodiment, a description has been given of a DHCP server having no DNS registration function in which the DHCP Ack without the specification of Option 81 is transmitted. In the fourth embodiment, a description has been given of a DHCP server in which the DNS registration function is prepared but the DHCP Ack does not indicate whether or not the registration with respect to the DNS server has succeeded.

In the second to fourth embodiments, a data process according to a specific type of DHCP servers has been described, but one data process may cope with any type of DHCP servers.

FIG. 10 shows a table in which operations of the data processing device 201 are summarized. A row 1011 shows what the registration result indicated by the DHCP represents. A row 1012 shows whether or not the data processing device 201 transmits the DNS registration instruction. A row 1013 shows what the registration result received by the data processing device 201 from the DNS server 203 represents. A row 1014 shows the content displayed on the operation panel.

Columns 1015 to 1019 respectively show operational patterns. In the case of the column 1015, the DHCP Ack indicates success, so the data processing device 201 does not transmit the registration instruction and displays the message "the update of the DNS record is succeeded". In the case of the column 1016, the DHCP Ack indicates failure, so the data processing device 201 by itself transmits the registration instruction. As a result, the registration is successful and the data processing device 201 displays the message "the update of the DNS record has succeeded". Then, in the case of the column 1019, because Option 81 is not specified to the DHCP Ack, the data processing device 201 inquires with the DNS server 203 as to whether the IP address of the data processing device 201 itself is registered or not, and furthermore the data processing device 201 by itself transmits the registration instruction. Even so, the registration with respect to the DNS server 203 has failed, and the data processing device 201 displays the message "the update of the DNS record has failed".

It should be noted that FIG. 11 is a table in which the operations of the data processing device 201 in the first embodiment are summarized. Columns 1020 to 1025 respectively show operational patterns. In the column 1021, the message "the update of the DNS record is succeeded" is displayed through the comprehensive judgment by the data processing device 201. This is because the data processing device 201 by itself transmits the registration instruction to the DNS server 203, and as a result the registration result indicates failure, but the DHCP Ack indicates success. On the other hand, in the column 1025, the message "the update of the DNS record has failed" is displayed through the comprehensive judgment by the data processing device 201. This is because the data processing device 201 by itself transmits the registration instruction to the DNS server 203, and as a result the registration result indicates failure and also the DHCP Ack has no specification of Option 81.

Moreover, in the first to fourth embodiments, the data processing device 201 creates the FQDN on the basis of the host name and the domain name received from the DHCP server 204, and the created FQDN is registered as the host name in the DNS server 203. However, the host name transmitted from the DHCP server 204 to the data processing device 201 may be registered as it is in the DNS server 203.

According to the present invention, to register the identification information for identifying the data processing device and the address of the data processing device, the registration from the first server to the second server and the registration from the data processing device to the second server without intermediation of the first server can be used in combination. As a result, it is possible to register the identification information to identify the data processing device and the address of the data processing device more reliably.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-126371 filed Apr. 25, 2005, which is hereby incorporated by reference herein in its entirety.

What is claimed is:

1. A data processing device, comprising:
    a memory including:
        an address obtaining unit that obtains an address of the data processing device from a first server;
        a request unit that requests the first server to transmit identification information for identifying the data processing device and the address obtained by the address obtaining unit to a second server to register the identification information and the address; and
        a transmission unit that transmits the identification information for identifying the data processing device and the address obtained by the address obtaining unit to the second server without intermediation of the first server to register the identification information and the address,
        wherein both the request by the request unit and the transmission by the transmission unit are performed automatically after the address obtaining unit obtains the address.

2. The data processing device according to claim 1, wherein the first server comprises a server that manages an address to be allocated to a device on a network, and the second server comprises a server that manages an association between identification information for identifying the device on the network and the address assigned to the device.

3. The data processing device according to claim 1, wherein the identification information for identifying the data processing device comprises a host name of the data processing device.

4. The data processing device according to claim 1, further comprising:
    a result obtaining unit that obtains a registration result of the identification information for identifying the data processing device and the address obtained by the address obtaining unit from the first server,
    wherein the transmission unit transmits the identification information and the address to the second server without intermediation of the first server when the registration result obtained by the result obtaining unit indicates failure.

5. The data processing device according to claim 1, further comprising:
    a response reception unit that receives a response corresponding to a request of the request unit from the first server,
    wherein the transmission unit transmits the identification information and the address to the second server without intermediation of the first server when the response received by the response reception unit indicates that the first server does not have a function of transmitting the identification information and the address to the second server.

6. The data processing device according to claim 1, further comprising:
    an inquiry unit that inquires with the second server as to whether the identification information for identifying the data processing device or the address obtained by the address obtaining unit is registered,
    wherein the transmission unit transmits the identification information and the address to the second server without intermediation of the first server when the identification information for identifying the data processing device and the address obtained by the address obtaining unit are not registered.

7. The data processing device according to claim 1, further comprising:
    a result obtaining unit that obtains a registration result of the identification information for identifying the data processing device and the address obtained by the address obtaining unit from at least one of the first server and the second server; and
    a notification unit that notifies a user of a registration result of the identification information for identifying the data processing device and the address obtained by the address obtaining unit on the basis of the registration result obtained by the result obtaining unit.

8. The data processing device according to claim 1, wherein:
    the address obtaining unit obtains an address of the second server; and
    the transmission unit transmits the identification information for identifying the data processing device and the address obtained by the address obtaining unit to the second server on the basis of the address of the second server obtained by the address obtaining unit.

9. A data processing device, comprising:
    a memory including:
        an address obtaining unit that obtains an address of the data processing device from a DHCP server with use of a DHCP;
        a request unit that requests the DHCP server to register identification information for identifying the data processing device and the address obtained by the address obtaining unit in a DNS; and
        a registration unit that registers the identification information for identifying the data processing device and the address obtained by the address obtaining unit in the DNS without intermediation of the DHCP server,
        wherein both the request by the request unit and the registration by the registration unit are performed automatically after the address obtaining unit obtains the address.

10. The data processing device according to claim 9, further comprising a notification unit that notifies a user of a registration result with respect to the DNS of the identification information for identifying the data processing device and the address obtained by the address obtaining unit.

11. A registration method of registering identification information for identifying a data processing device and an address of the data processing device, comprising the steps of:
    making a request from the data processing device to a first server for causing the first server to transmit the identification information for identifying the data processing device and the address assigned to the data processing device by the first server to a second server to register the identification information and the address; and
    transmitting the identification information for identifying the data processing device and the address assigned to the data processing device by the first server from the data processing device to the second server to register the identification information and the address without intermediation of the first server, wherein both the request to the first server and the transmission to the second server are performed automatically after the address is assigned to the data processing device.

12. A registration method of registering identification information for identifying a data processing device and an address of the data processing device in a DNS, comprising the steps of:
  making a request from the data processing device to a DHCP server for causing the DHCP server to register in the DNS the identification information for identifying the data processing device and the address assigned with use of the DHCP to the data processing device; and
  registering in the DNS the identification information for identifying the data processing device and the address assigned with use of the DHCP to the data processing device, without intermediation of the DHCP server,
  wherein both the request to the DHCP server and the registration without intermediation of the DHCP server are performed automatically after the address is assigned to the data processing device.

13. A computer program stored in a storage medium, for controlling a computer to execute the steps of:
  obtaining an address of the computer from a first server;
  making a request from the computer to the first server for causing the first server to transmit the identification information for identifying the computer and the address obtained in the address obtaining step to a second server to register the identification information and the address; and
  transmitting the identification information for identifying the computer and the address assigned to the computer by the first server from the computer to the second server to register the identification information and the address without intermediation of the first server,
  wherein both the request to the first server and the transmission to the second server are performed automatically after the address is obtained.

* * * * *